March 3, 1936  E. CULVER ET AL  2,032,796
LENS
Original Filed May 23, 1930
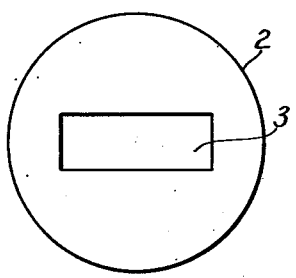
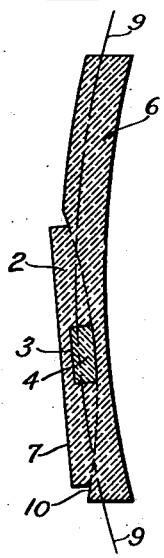
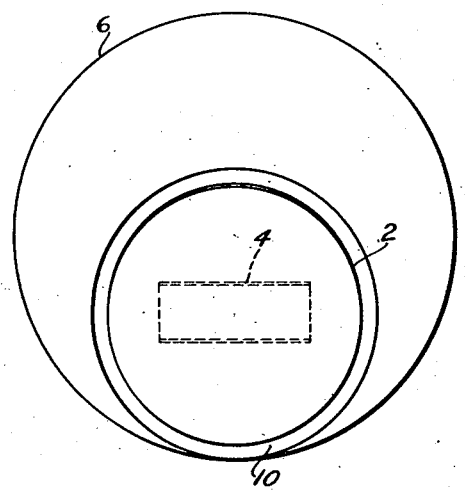
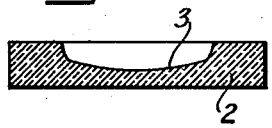
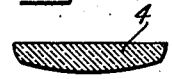
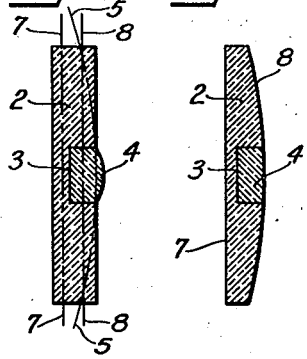
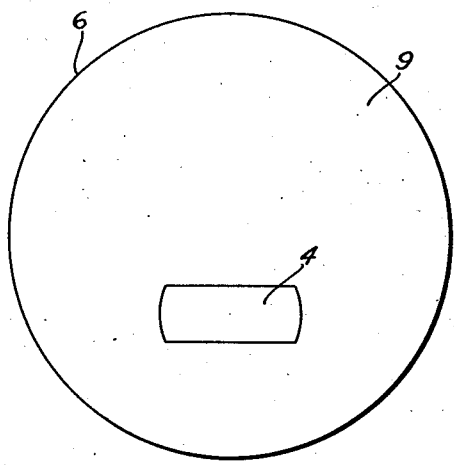
INVENTORS
EDWARD CULVER
ALFRED H. EMERSON.
BY
ATTORNEYS Patented Mar. 3, 1936

2,032,796

UNITED STATES PATENT OFFICE 2,032,796

LENS

Edward Culver and Alfred Henry Emerson, London, England, assignors to United Kingdom Optical Company, Limited, London, England Original application May 23, 1930, Serial No. 455,030. Divided and this application April 6, 1933, Serial No. 664,796

3 Claims. (Cl. 49—82.1)

This invention relates to an improved method of manufacture of fused bifocal lenses, and more particularly has reference to the preparation of the button formed of the same glass as the major lens and its insert of glass of a higher refractive index, which button after surfacing is fused into a correspondingly ground depression in the major lens.

In the older forms of fused bifocal lenses familiarly known as kryptok, Twofo, etc., the reading portion is formed by fusing into a spherically worked depression, ground in a major crown lens (commonly called a countersink) a flint lens, which has one spherical surface worked so as substantially to fit the depression in the crown lens which after fusing and surfacing in the ordinary way produces a bifocal lens blank having a circular reading portion. It is well known that the diameter of this reading circle is kept relatively small for the reasons that manufacturing difficulties arise when large sizes are attempted. Moreover, large sizes give rise to extra thickness in the completed lens and excessive chromatic aberration: small sizes are still adhered to although the diameter of the reading circle is one of the factors governing the position of the optical center in this type of lens. A further disadvantage is that the reading portion reaches to the bottom of the completed lens so that the user cannot see the ground or steps clearly except by looking either over or to one side of the reading portion.

In the fused bifocal described in the specification of Patent No. 1,632,208, the button in certain cases is prepared by fusing two pieces of crown glass on either side of an oblong piece of flint glass (of a higher refractive index), but, while by this method, some of the disadvantages outlined above are overcome, it is impossible to control the prismatic power, more especially as to direction, as explained in our British Patent No. 346,866 accepted April 28, 1931.

The main object of this invention is to provide a method of manufacture so that these important conditions of a bifocal lens can be accurately controlled, i. e., the size, shape and also the position of the optical center of the reading portion.

A further object of the invention is the provision of a button, by means of which if desired, any desired amount or direction of prism can be obtained in the final lens.

This application is a division of application Serial No. 455,030, filed May 23, 1930.

In the accompanying drawing:

Figure 1 is an elevation of a plate of glass or button body for use in the manufacture of a button in accordance with this invention.

Figure 2 is a diametrical section through the button body shown in Figure 1.

Figure 3 is a central section through the long axis of the insert which is secured within the socket in Figure 2.

Figure 4 is a central vertical section through the button formed by securing the insert of Figure 3 in the socket of the button in Figure 2.

Figure 5 is a central vertical section of the button in Figure 4 after the proper curves have been ground and polished on its faces.

Figure 6 is a central vertical section through a bifocal lens blank made by fusing the button of Figure 5 into a countersink in a major lens.

Figure 7 is an elevation of the bifocal lens blank shown in cross-section in Figure 6.

Figure 8 is an elevation of a finished lens made by surfacing the bifocal lens blank of Figures 6 and 7 with curves suitable for a patient's prescription.

Referring to the drawing in detail, 2 is a plate of glass or button body in which is formed a socket 3 for the reception of an insert 4 of similar shape. The insert 4 is mounted, preferably by fusion, in the button body 2 to form the button shown in Figure 4. The button 4 is now ground and polished with one side having a curved surface indicated by the chain line 5 substantially to fit the countersink 10 ground and polished in the major lens 6 (Figure 6).

The other side of the button may be ground and polished with a surface of any desired curvature, such as the plano surface indicated by the chain line 7, in order that the button may be inspected for defects prior to its being fused into the countersink in the major lens. The button, thus finished, is fused into the countersink 10 of the major lens, which is then ground and polished to a suitable surface curvature indicated by the chain line 9 in Figure 6.

The glass for the button body 2 is usually of crown glass and is selected so as to have the same optical and physical properties as the glass used for the major lens 6. The inside of the socket 3 in the button body 2 is suitably prepared in the usual manner for the reception of the insert 4, which is of a size so as nearly to fit the former and which is also suitably prepared for being placed in position. The two parts 2 and 4 of the button are then placed in a furnace and raised to a temperature high enough to soften the insert so that it fuses at its edges and bottom integrally with the button body 2 and forms the compound button shown in Figure 4. After fusion this button is well annealed and is then surfaced substantially to correspond with the countersink curve 10 ground in the major lens 6, in the usual way, although greater accuracy is required than is normally the case with a fused bifocal lens other than the type referred to above.

The socket 3 may be cut or otherwise formed in one side of the glass plate or button body 2, into which socket a piece of glass 4 of higher refractive index is fused. It will thus be seen that the insert 4 of high index glass which is to become the reading segment is surrounded or nearly surrounded by glass of exactly the same properties as the major lens 6, the shape of the socket 3 mainly determining the final shape of the reading portion, and which depression may be circular, oblong, oval or any other desired shape, such for example as the major segment of a circle.

By our use of the term "socket" herein, we refer to a cavity with a bottom and side walls as distinguished from a perforation which lacks a bottom.

By our invention it will thus be seen that we have provided a method of manufacture so that certain important conditions of a bifocal lens can be accurately controlled, i. e., the size, shape and also the position of the optical center of the reading portion. We have also provided a button, by means of which if desired, any amount of direction or prism can be obtained in the final lens.

It will be understood that we desire to comprehend within our invention such modifications as may be necessary to adapt it to varying conditions and uses.

Having thus fully described our invention, what we claim as new and desire to secure by Letters Patent, is:

1. A process of making a bifocal lens blank for a multifocal lens including first making a button by forming a socket with a bottom and approximately parallel side walls in the face of a segment body, forming an insert of a different index of refraction from said segment body, placing said insert in said socket so as to rest on the bottom of said socket, applying heat to cause said insert to flow laterally and engage said side walls, and fusing said button to the face of a major lens to form a complete lens blank.

2. A process of making a bifocal lens blank for a multifocal lens including first making a button by forming a socket with a bottom of substantial thickness and approximately perpendicular side walls in the face of a segment body, forming an insert of a different index of refraction from said segment body, placing said insert in said socket so as to rest on the bottom of said socket, applying heat to cause said insert to flow laterally and engage said side walls, surfacing the exposed side of said insert and said segment body to a curvature suitable for engagement with the countersink of a major lens, and fusing the button so formed into the countersink of the major lens.

3. A process of making a bifocal lens blank, including forming a socket with a bottom and steeply angled side walls in a segment body, forming an insert of a different index of refraction, securing said insert in said socket; forming a countersink in a major lens, forming a curved surface on the insert side of said segment piece with a curvature suitable for said countersink, securing said segment within said countersink, and surfacing the segment side of said blank to grind away the bottom of said socket and expose said insert.

EDWARD CULVER.
ALFRED HENRY EMERSON.